United States Patent [19]

Ames et al.

[11] 3,988,480

[45] Oct. 26, 1976

[54] ACETIC ACID-PROTEIN COMPOSITIONS WITH DECREASED RUMEN DIGENTIBILITY

[75] Inventors: Stanley R. Ames, Rochester, N.Y.; Charles D. Robeson, Kingsport, Tenn.

[73] Assignee: Eastman Kodak Company, Rochester, N.Y.

[22] Filed: Aug. 4, 1975

[21] Appl. No.: 601,904

[52] U.S. Cl. .................................. 426/2; 426/630; 426/634; 426/807
[51] Int. Cl.² ........................................... A23K 1/00
[58] Field of Search ................. 426/2, 49, 52–54, 426/429–430, 622, 623, 635, 656, 807, 626, 335, 634, 630; 260/112 R

[56] References Cited

UNITED STATES PATENTS

| | | | |
|---|---|---|---|
| 3,711,290 | 1/1973 | Miller | 426/2 |
| 3,809,779 | 5/1974 | Lee | 260/112 R |

*Primary Examiner*—A. Louis Monacell
*Assistant Examiner*—R. B. Penland
*Attorney, Agent, or Firm*—Elliott Stern; Daniel B. Reece, III

[57] ABSTRACT

A proteinaceous feedstuff for ruminants comprising the reaction product of a protein containing meal and from 2 to about 8 percent, based on the weight of the meal, of acetic acid, the meal thereby being rendered resistant to microbial breakdown in the rumen but not resistant to substantial digestive breakdown in the abomasum and intestines.

7 Claims, No Drawings

ACETIC ACID-PROTEIN COMPOSITIONS WITH DECREASED RUMEN DIGESTIBILITY

This invention relates to a method for improving the protein utilization of ruminants. More specifically, this invention relates to modified protein feed compositions useful in ruminant nutrition which are resistant to microbial attack in the rumen but not resistant to substantial digestive breakdown in the abomasum and intestines.

The rumen, the largest of the four stomach compartments of ruminants, serves as an important location for metabolic breakdown of ingested foodstuffs through the action of microorganisms which are present therein. Ingested food is typically retained in the rumen for from about 12 to 30 hours during which time it is subject to metabolic breakdown by the rumen microorganisms. Much ingested protein material is broken down in the rumen to soluble peptides and amino acids and utilized by the rumen microorganisms. When the rumen contents pass into the abomasum and intestine, the microbial mass is digested, thus providing protein to the ruminant.

Because proteins are subject to breakdown in the rumen thereby rendering the supplemental protein uptake inefficient, it has been suggested nutrient protein containing materials fed to ruminants be treated so as to permit passage without microbial breakdown through the rumen to the abomasum. Suggested procedures have included coating the protein material, for example, with fats and vegetable oils; heat treatment of the protein material; reaction of the protein material with formaldehyde, actylenic esters, polymerized unsaturated carboxylic acid or anhydrides and phosphonitrilic halides, etc. In any event, the treated material must be resistant to breakdown in the rumen fluid, which is a fluid buffered at about pH 6–7 by phosphate-bicarbonate from saliva and carbon dioxide but subject to breakdown in the acid medium of the fluid of the abomasum which has a pH due principally to hydrochloric acid secretion of about 2–4.

It has been found, in accordance with the present invention, the protein utilization of the ruminant animal is improved by feeding the animal the reaction product of a protein containing nutrient meal and acetic acid, the amount of acetic acid in the reaction product being sufficient to prevent substantial microbial breakdown in the fluid medium of the rumen but insufficient to prevent digestive breakdown in the fluid media of the abomasum and of the intestines.

In a preferred embodiment of this invention the amount of acetic acid utilized is from about 2 to about 8 percent, based on the weight of the meal to be treated. In an especially preferred embodiment of this invention there is provided a proteinaceous feedstuff for ruminants which comprises the reaction product of meal and from about 2 to about 8 percent, based on the weight of the meal, of acetic acid in the presence of a commercially acceptable non-polar organic solvent suitable for use in the extraction of edible oils from the meal. The meal is thereby rendered resistant to breakdown in the rumen but not resistant to substantial breakdown in the abomasum and intestines. The reacting temperature can vary from room temperature to the reflux temperature of the solvent in which the reaction is carried out.

The protein containing nutrient meal can be from any suitable source including animal, plant, or synthetic sources. For example, suitable meals which may be treated according to this invention are soybean meal, fish meal, peanut meal, linseed meal, cottonseed meal, palm kernel meal, sesame meal, and the like. The preferred protein containing meals are those normally obtained by the solvent extraction method to remove the edible oils. Especially preferred are those meals obtained from vegetable seeds. These meals are known in the art as solvent meal and are produced by the solvent extraction method. They are well established as satisfactory protein supplements for ruminants such as cattle and sheep.

Although the treatment of the meal can be accomplished by using glacial acetic acid or aqueous acetic acid, in a preferred embodiment of this invention the treatment is carried out in the presence of a commercially acceptable non-polar organic solvent which is suitable for use in the extraction of the edible oils from the nutritive meals. Examples of such solvents are hexane, heptane, octane, petroleum ethers, benzene alkyl benzenes, and cyclohexane. Other organic solvents useful include the halogenated hydrocarbons such as methylene chloride or dichloromethane, organic esters, acetonitrile, dimethylformamide and the freons. One of the advantages of the process of the invention is that the preparation of the feedstuffs can be conveniently carried out during the normal processing conditions by adding acetic acid during the extraction of the edible oils from the meal. In an especially preferred embodiment of this invention the feedstuff is prepared from soybeans.

It is to be understood the modified ruminant protein feedstuff of the present invention can be fed separately to the animal or can be used for incorporation with other ruminant feed materials. Illustrative of such ruminant feed materials are ground corn, sorghum grain, hay, straw, cottonseed hulls, cottonmill waste, feedpulp, silage, oats, barley, cereal brans, cereal middlings, etc., and combinations thereof. It desired other components, for example, minerals such as bone meal, salt and trace minerals, antibiotics and vitamins may be included in the animal feed ration.

The following examples illustrate the effectiveness of the proteinaceous feedstuffs of this invention in protecting protein containing meal materials from digestion in the rumen while permitting digestion in the abomasum and intestines. The samll scale in vitro experiements shown in the examples simulate conditions existing in the rumen thereby permitting the study of treated protein without the use of the live animals and large quantities of feed materials. It is understood the examples are presented for the purpose of illustration only and the invention is not limited to the compositions or methods shown therein.

EXAMPLE 1

Rumen Digestion Test

Rumen contents were drawn from sheep via stomach tubes and filtered through four layers of cheesecloth. The resultant rumen fluid was buffered at a ratio of 4 parts rumen fluid and 1 part phosphate buffer (M/15 phosphate buffer, pH 7). Care was taken to prewarm the flasks and buffer before they were put in contact with the rumen fluid. The rumen fluid was sampled, processed and added to the incubation flask as rapidly as possible.

A measured quantity of substrate was placed in the flask prior to the addition of the rumen fluid. The incubation was started by adding 25 ml. of buffered rumen fluid to a 50 ml. Erlenmeyer flask maintained at 40° C. in a water bath and capping with rubber stoppers fitted with Bunsen valves. Bunsen valves allow the release of gas pressure without permitting air to enter. During incubation the flasks were shaken at a rate of 100 oscillations per minute. Incubations were performed in triplicate and carried out for as long as 21 hours. The fermentation was stopped by the addition of 5 ml. of 25% metaphosphoric acid and refrigerated until analysis. After centrifugation (2000 × 30 minutes) to sediment solids, rumen fluid was analyzed for ammonia colorimetrically utilizing the Berthelot reaction [Technicon AutoAnalyzer Methodology, "Ammonia in Water and Waste Water", Industrial Method Ind., 19-69W (1969)], and automated using the Technicon AutoAnalyzer. Each analysis was done in triplicate. The analytical technique was designed so that the rumen fluid from the incubation could be put directly into the sampling cups of the AutoAnalyzer and analyzed without further handling or dilution. A standard curve utilizing rumen fluid of known ammonia content was run each day of analysis. The concentration of ammonia in the samples was calculated from the regression computed from the standard curve. The standard rumen fluid was calibrated by the microdiffusion method of Conway [Conway, E. J., "Microdiffusion Analysis and Volumetric Error," Crosby, Lockwood and Son, Ltd., London Third Edition (1950)].

Treated meal was prepared by contacting commercially obtained soybean meal (20–30 mesh) with the desired amount of acid. When prepared in aqueous solvent, sufficient water is added with the acid to totally wet the meal. Contact was maintained for 4 hours after which the treated soybean meal was allowed to air dry. When prepared in organic solvent, about 125 ml. of hexane solvent was used for every 50 grams of soybean meal. The acid was then added and the mixture was refluxed for seven hours, filtered and then air dried.

The relative protection of an experimentally treated meal preparation was determined by incubating 500 mg. of the preparation in buffered rumen fluid for 21 hours along with negative and positive controls (i.e., buffered rumen fluid with no added substrate, buffered rumen fluid with 500 mg. meal). The relative protection was determined by calculating the amount of ammonia produced due to the addition of the meal and the percentage reduction (within each incubation run) of ammonia due to treatment of the meal. The results were expressed in the following manner: If the percentage equals 0 to 20%, protection equaled 0, 20% to 40% equaled ¼, 20% to 65% equaled ½, 65% to 90% equaled ¾, and 90%+ equaled full protection.

The following Table 1 describes the results of the degree of protection obtained on soybean meal after treatment with formic, acetic, propionic, isobutyric, isovaleric and phosphoric acids and a control in aqueous acid solvent and/or in hexane solvent reflux.

Table 1

| Acid | Level of Acid Addition, % | Degree of Protection In aqueous solvent*, room temperature | Degree of Protection In hexane solvent, reflux temperature |
|---|---|---|---|
| Formic | 4 | — | 0 |
|  | 8 | 0 | — |
| Acetic | 0.5 | — | ¼ |
|  | 1 | — | ¼ |
|  | 2 | — | ½ |
|  | 4 | — | full |
|  | 8 | ½ | full |
|  | 16 | ¾ | full |
| Propionic | 0.5 | — | 0 |

Table 1-continued

| Acid | Level of Acid Addition, % | Degree of Protection In aqueous solvent*, room temperature | Degree of Protection In hexane solvent, reflux temperature |
|---|---|---|---|
|  | 1 | — | ¼ |
|  | 2 | — | ¼ |
|  | 4 | — | ½ |
| Isobutyric | 0.5 | — | 0 |
|  | 1 | — | 0 |
|  | 2 | — | ¼ |
|  | 4 | — | ½ |
| Isovaleric | 0.5 | — | 0 |
|  | 1 | — | 0 |
|  | 2 | — | ¼ |
|  | 4 | — | ½ |
| Phosphoric ($H_3PO_4$) | 0.5 | — | 0 |
|  | 1 | — | 0 |
|  | 2 | — | 0 |
|  | 4 | — | 0 |
| None | — | — | 0 |

*Sufficient water is added to soybean meal in addition to the acid to totally wet the composition.

The results obtained show that the acetic acid treated animal feed compositions described according to the invention are resistant to attack by rumen microorganisms while other similar acid treated feeds are not fully protected. This results in the desired passage of the composition through the rumen without substantial microbial breakdown. Protein utilization by the ruminant animal is thereby improved.

The invention has been described in detail with particular reference to certain preferred embodiments thereof, but it will be understood that variations and modifications can be effected within the spirit and scope of the invention.

We claim:

1. A proteinaceous feedstuff for ruminants comprising the reaction product of a protein containing meal and from 8 to about 16%, based on the weight of the meal, of acetic acid, the meal thereby being rendered resistant to microbial breakdown in the rumen but not resistant to substantial digestive breakdown in the abomasum and intestines.

2. The proteinaceous feedstuff of claim 1 where the meal is soybean meal.

3. A proteinaceous feedstuff for ruminants comprising the reaction product of a protein containing meal and from 2 to about 16%, based on the weight of the meal, of acetic acid in the presence of a non-polar organic solvent suitable for use in the extraction of edible oils from the meal, the meal thereby being rendered resistant to microbial breakdown in the rumen but not resistant to substantial breakdown in the abomasum and intestines.

4. The proteinaceous feedstuff of claim 3 wherein the amount of acetic acid reacted with the protein containing meal is from 2 to about 8% and the solvent is selected from the group consisting of n-hexane and n-heptane.

5. The proteinaceous feedstuff of claim 4 wherein the meal is soybean meal.

6. A method for improving protein utilization of ruminants which comprises feeding the ruminant the reaction product of a protein containing meal and from 2 to about 16%, based on the weight of the meal, of acetic acid in the presence of a non-polar organic solvent suitable for use in the extraction of edible oils from the meal, the meal thereby being rendered resistant to microbial breakdown in the rumen but not resistant to substantial breakdown in the abomasum and intestines.

7. The method of claim 6 wherein the amount of acetic acid reacted with the protein containing meal is from about 2 to about 8% and the non-polar organic solvent is selected from the group consisting of n-hexane and n-heptane and the meal is soybean meal.

* * * * *